US012647166B2

(12) United States Patent
Marcone et al.

(10) Patent No.: US 12,647,166 B2
(45) Date of Patent: Jun. 2, 2026

(54) FREQUENCY OFFSET MEASUREMENT FOR IMPROVED BEAM SELECTION

(71) Applicant: Nokia Technologies Oy, Espoo (FI)

(72) Inventors: Alessio Marcone, Munich (DE); Axel Mueller, Massy (FR); Salah Eddine Hajri, Nozay (FR)

(73) Assignee: Nokia Technologies Oy, Espoo (FI)

( * ) Notice: Subject to any disclaimer, the term of this patent is extended or adjusted under 35 U.S.C. 154(b) by 309 days.

(21) Appl. No.: 18/294,052

(22) PCT Filed: Aug. 5, 2021

(86) PCT No.: PCT/EP2021/071894
§ 371 (c)(1),
(2) Date: Jan. 31, 2024

(87) PCT Pub. No.: WO2023/011720
PCT Pub. Date: Feb. 9, 2023

(65) Prior Publication Data
US 2025/0088240 A1 Mar. 13, 2025

(51) Int. Cl.
*H04B 17/309* (2015.01)
*H04B 7/06* (2006.01)
*H04B 7/08* (2006.01)
*H04B 17/318* (2015.01)

(52) U.S. Cl.
CPC ......... *H04B 7/0626* (2013.01); *H04B 17/328* (2023.05); *H04B 17/346* (2023.05)

(58) Field of Classification Search
CPC .. H04B 17/346; H04B 17/328; H04B 7/0626; H04B 7/08; H04B 7/06966
See application file for complete search history.

(56) References Cited

U.S. PATENT DOCUMENTS

| | | | |
|---|---|---|---|
| 10,924,171 B2 | 2/2021 | Chen et al. | |
| 2019/0058517 A1 | 2/2019 | Kang et al. | |
| 2019/0281487 A1 | 9/2019 | Liu et al. | |
| 2020/0374079 A1 | 11/2020 | Chervyakov et al. | |
| 2021/0111849 A1* | 4/2021 | Yang ..................... | H04L 5/0032 |

(Continued)

FOREIGN PATENT DOCUMENTS

| | | |
|---|---|---|
| WO | 2021/127582 A1 | 6/2021 |
| WO | 2022/152582 A1 | 7/2022 |

OTHER PUBLICATIONS

"3rd Generation Partnership Project; Technical Specification Group Radio Access Network; NR; Physical layer procedures for data (Release 16)", 3GPP TS 38.214, V16.6.0, Jun. 2021, pp. 1-172.

(Continued)

*Primary Examiner* — Kent Krueger
(74) *Attorney, Agent, or Firm* — Nokia Technologies Oy

(57) ABSTRACT
Disclosed is a method comprising receiving, from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

20 Claims, 10 Drawing Sheets

(56)             References Cited

U.S. PATENT DOCUMENTS

2024/0137754 A1*   4/2024   Balasubramanian ... H04W 8/22

OTHER PUBLICATIONS

"3rd Generation Partnership Project; Technical Specification Group Radio Access Network; NR; Radio Resource Control (RRC) protocol specification (Release 16)", 3GPP TS 38.331, V16.5.0, Jun. 2021, pp. 1-959.

"Revised WID on NR support for high speed train scenario in frequency range 2 (FR2)", 3GPP TSG-RAN Meeting #91-e, RP-210800, Agenda: 9.7.22, Samsung, Mar. 16-26, 2021, pp. 1-5.

"3rd Generation Partnership Project; Technical Specification Group Radio Access Network; Study on performance enhancements for high speed scenario in LTE (Release 13)", 3GPP TR 36.878, V13.0.0, Jan. 2016, pp. 1-92.

"WF on FR2 HST Deployment Scenario Analysis", 3GPP TSG-RAN WG4#98-bis-e Meeting, R4-2106100, Samsung, Apr. 12-20, 2021, pp. 1-16.

"Motivation for high-speed train enhancement in Rel-17 NR MIMO", 3GPP TSG RAN Meeting #86, RP-192729, Agenda: 9.1.1, CMCC, Dec. 9-12, 2019, pp. 1-7.

"Discussion on UE demodulation for NR support of high speed scenario", 3GPP TSG-RAN WG4 Meeting #92, R4-1908678, Agenda: 9.16.2.2, CMCC, Aug. 26-30, 2019, 5 pages.

"On HST SFN enhancements", 3GPP TSG RAN WG1 Meeting #102-e, R1-2005862, Agenda: 8.1.2.4, Intel Corporation, Aug. 17-28, 2020, pp. 1-10.

"Discussion on enhancements on HST-SFN deployment", 3GPP TSG RAN WG1 #102-e, R1-2005687, Agenda: 8.1.2.4, CATT, Aug. 17-28, 2020, 8 pages.

International Search Report and Written Opinion received for corresponding Patent Cooperation Treaty Application No. PCT/EP2021/071894, dated May 17, 2022, 14 pages.

"3rd Generation Partnership Project; Technical Specification Group Radio Access Network; NR; NR support for high speed train scenario in frequency range 2 (FR2) (Release 17)", 3GPP TR 38.854, V0.1.0, May 2021, pp. 1-25.

Bai et al., "Analysis of RSRP Prediction in Millimeter Wave Systems", 53rd Asilomar Conference on Signals, Systems, and Computers, Nov. 3-6, 2019, pp. 789-793.

"On HST FR2 Channel Modeling", 3GPP TSG-RAN WG4 Meeting # 100-e, R4-2114547, Agenda: 9.9.2.3, Nokia, Aug. 16-27, 2021, 9 pages.

* cited by examiner

901    Receive CSI-RS resources

902    Measure frequency offset per RX beam

1001    Transmit CSI-RS resources on a first TX beam

1002    Transmit CSI-RS resources on a second TX beam

1003    Receive indication

1004    Select beam based on the indication

1100

1200

FREQUENCY OFFSET MEASUREMENT FOR IMPROVED BEAM SELECTION

RELATED APPLICATION

This application was originally filed as PCT Application No. PCT/EP2021/071894, filed on Aug. 5, 2021, of which is incorporated herein by reference in its entirety.

FIELD

The following exemplary embodiments relate to wireless communication.

BACKGROUND

A wireless communication device may use different beams for directional signal transmission or reception. It is desirable to select the beam that provides the best link performance.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive, from a base station, in a first time slot, a first plurality of channel state information reference signal resources comprising at least two channel state information reference signal resources; and measure a first frequency offset value per receive beam on a plurality of receive beams by utilizing two or more resources of the first plurality of channel state information reference signal resources per receive beam.

According to another aspect, there is provided an apparatus comprising means for: receiving, from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

According to another aspect, there is provided a method comprising: receiving, from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

According to another aspect, there is provided a computer program comprising instructions for causing an apparatus to perform at least the following: receiving, from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

According to another aspect, there is provided a computer program product comprising program instructions which, when run on a computing apparatus, cause the computing apparatus to perform at least the following: receiving, from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

According to another aspect, there is provided a computer readable medium comprising program instructions for causing an apparatus to perform at least the following: receiving, from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

According to another aspect, there is provided a non-transitory computer readable medium comprising program instructions for causing an apparatus to perform at least the following: receiving, from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

According to another aspect, there is provided an apparatus comprising at least one processor, and at least one memory including computer program code, wherein the at least one memory and the computer program code are configured, with the at least one processor, to cause the apparatus to: transmit, to a terminal device, in a first time slot and on a first transmit beam, a first plurality of channel state information reference signal resources comprising at least two channel state information reference signal resources; transmit, to the terminal device, in a second time slot and on a second transmit beam, a second plurality of channel state information reference signal resources comprising at least two channel state information reference signal resources; receive, from the terminal device, an indication indicating at least a first value associated with the first transmit beam and/or a second value associated with the second transmit beam, wherein the first value and the second value indicate a frequency offset or a variation in a signal-to-noise ratio; and select a beam based at least partly on the indication received from the terminal device, wherein the beam is selected from a plurality of beams comprising at least the first transmit beam and the second transmit beam.

According to another aspect, there is provided an apparatus comprising means for: transmitting, to a terminal device, in a first time slot and on a first transmit beam, a first plurality of channel state information reference signal resources comprising at least two channel state information reference signal resources; transmitting, to the terminal device, in a second time slot and on a second transmit beam, a second plurality of channel state information reference signal resources comprising at least two channel state information reference signal resources; receiving, from the terminal device, an indication indicating at least a first value associated with the first transmit beam and/or a second value associated with the second transmit beam, wherein the first value and the second value indicate a frequency offset or a variation in a signal-to-noise ratio; and selecting a beam based at least partly on the indication received from the terminal device, wherein the beam is selected from a plurality of beams comprising at least the first transmit beam and the second transmit beam.

According to another aspect, there is provided a method comprising: transmitting, to a terminal device, in a first time slot and on a first transmit beam, a first plurality of channel state information reference signal resources comprising at least two channel state information reference signal resources; transmitting, to the terminal device, in a second time slot and on a second transmit beam, a second plurality of channel state information reference signal resources comprising at least two channel state information reference signal resources; receiving, from the terminal device, an indication indicating at least a first value associated with the first transmit beam and/or a second value associated with the second transmit beam, wherein the first value and the second value indicate a frequency offset or a variation in a signal-to-noise ratio; and selecting a beam based at least partly on the indication received from the terminal device, wherein the beam is selected from a plurality of beams comprising at least the first transmit beam and the second transmit beam.

According to another aspect, there is provided a computer program comprising instructions for causing an apparatus to perform at least the following: transmitting, to a terminal device, in a first time slot and on a first transmit beam, a first plurality of channel state information reference signal resources comprising at least two channel state information reference signal resources; transmitting, to the terminal device, in a second time slot and on a second transmit beam, a second plurality of channel state information reference signal resources comprising at least two channel state information reference signal resources; receiving, from the terminal device, an indication indicating at least a first value associated with the first transmit beam and/or a second value associated with the second transmit beam, wherein the first value and the second value indicate a frequency offset or a variation in a signal-to-noise ratio; and selecting a beam based at least partly on the indication received from the terminal device, wherein the beam is selected from a plurality of beams comprising at least the first transmit beam and the second transmit beam.

According to another aspect, there is provided a computer program product comprising program instructions which, when run on a computing apparatus, cause the computing apparatus to perform at least the following: transmitting, to a terminal device, in a first time slot and on a first transmit beam, a first plurality of channel state information reference signal resources comprising at least two channel state information reference signal resources; transmitting, to the terminal device, in a second time slot and on a second transmit beam, a second plurality of channel state information reference signal resources comprising at least two channel state information reference signal resources; receiving, from the terminal device, an indication indicating at least a first value associated with the first transmit beam and/or a second value associated with the second transmit beam, wherein the first value and the second value indicate a frequency offset or a variation in a signal-to-noise ratio; and selecting a beam based at least partly on the indication received from the terminal device, wherein the beam is selected from a plurality of beams comprising at least the first transmit beam and the second transmit beam.

According to another aspect, there is provided a computer readable medium comprising program instructions for causing an apparatus to perform at least the following: transmitting, to a terminal device, in a first time slot and on a first transmit beam, a first plurality of channel state information reference signal resources comprising at least two channel state information reference signal resources; transmitting, to the terminal device, in a second time slot and on a second transmit beam, a second plurality of channel state information reference signal resources comprising at least two channel state information reference signal resources; receiving, from the terminal device, an indication indicating at least a first value associated with the first transmit beam and/or a second value associated with the second transmit beam, wherein the first value and the second value indicate a frequency offset or a variation in a signal-to-noise ratio; and selecting a beam based at least partly on the indication received from the terminal device, wherein the beam is selected from a plurality of beams comprising at least the first transmit beam and the second transmit beam.

According to another aspect, there is provided a non-transitory computer readable medium comprising program instructions for causing an apparatus to perform at least the following: transmitting, to a terminal device, in a first time slot and on a first transmit beam, a first plurality of channel state information reference signal resources comprising at least two channel state information reference signal resources; transmitting, to the terminal device, in a second time slot and on a second transmit beam, a second plurality of channel state information reference signal resources comprising at least two channel state information reference signal resources; receiving, from the terminal device, an indication indicating at least a first value associated with the first transmit beam and/or a second value associated with the second transmit beam, wherein the first value and the second value indicate a frequency offset or a variation in a signal-to-noise ratio; and selecting a beam based at least partly on the indication received from the terminal device, wherein the beam is selected from a plurality of beams comprising at least the first transmit beam and the second transmit beam.

According to another aspect, there is provided a system comprising at least a base station and a terminal device. The base station is configured to: transmit, to the terminal device, in a first time slot and on a first transmit beam, a first plurality of channel state information reference signal resources comprising at least two channel state information reference signal resources. The terminal device is configured to: receive, from the base station, the first plurality of channel state information reference signal resources; and measure a first frequency offset value per receive beam on a plurality of receive beams by utilizing two or more resources of the first plurality of channel state information reference signal resources per receive beam.

According to another aspect, there is provided a system comprising at least a base station and a terminal device. The base station comprises means for: transmitting, to the terminal device, in a first time slot and on a first transmit beam, a first plurality of channel state information reference signal resources comprising at least two channel state information reference signal resources. The terminal device comprises means for: receiving, from the base station, the first plurality of channel state information reference signal resources; and measuring a first frequency offset value per receive beam on a plurality of receive beams by utilizing two or more resources of the first plurality of channel state information reference signal resources per receive beam.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figures 1, 2:
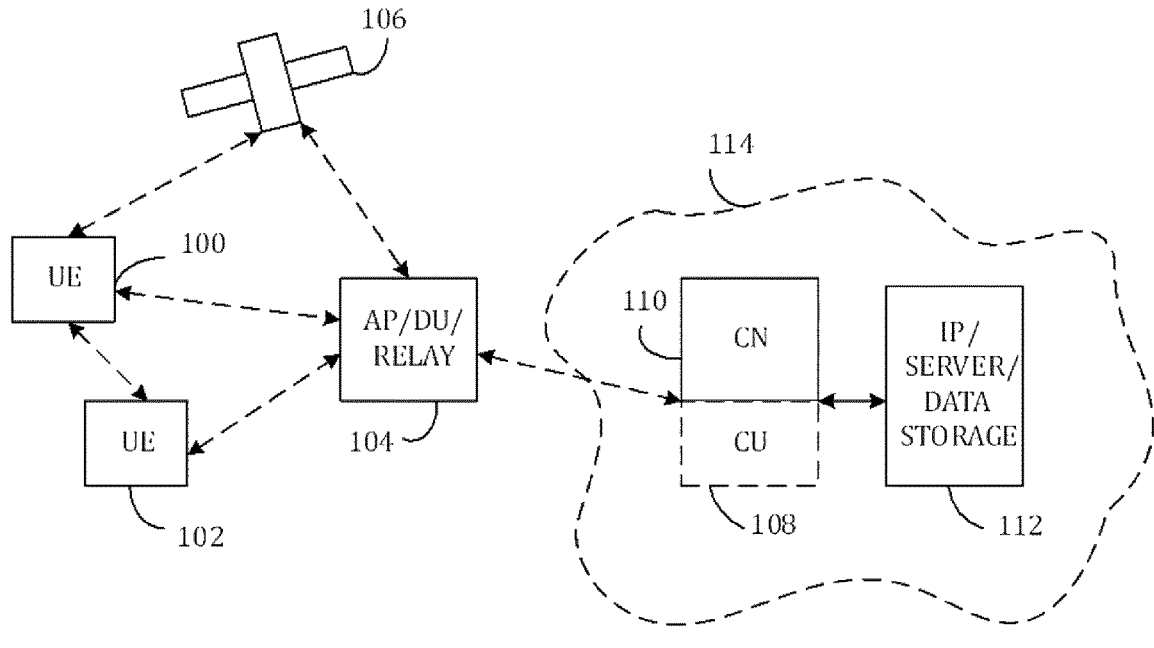
FIG. 1 illustrates an exemplary embodiment of a cellular communication network.
FIG. 2 illustrates an example of a high-speed train single-frequency network deployment.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g) NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular megaconstellations (systems in which hundreds of (nano)satellites are deployed). At least one satellite 106 in the megaconstellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g)NodeBs of FIG. 1 may provide any kind of these cells. A cellular radio system may be implemented as a multilayer network including several kinds of cells. In multilayer networks, one access node may provide one kind of a cell or cells, and thus a plurality of (e/g)NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

5G NR operating in millimeter wave bands, i.e. frequency range 2 (FR2) from 24.25 GHz to 52.6 GHz, enables high data rates due to the large amount of bandwidth available in FR2. High-speed train (HST) systems are being deployed worldwide at an increasing rate, and there is a need to provide high-speed connections for passengers and HST special services. However, wireless communication in the HST scenario is characterized by a highly time-varying channel and rapid changes of the closest transmission and receptions points (TRPs) to the train, resulting from the high velocity of the train (for example above 200 km/h). Furthermore, the Doppler shift and Doppler spread in FR2 are more severe compared to lower frequency bands. Thus, there is a challenge in how to provide NR support for the HST scenario in FR2.

HST operation in FR2 may comprise single-frequency network (SFN) deployments, wherein different non-collocated remote radio heads (RRHs) may share a single cell identifier. SFN means that the TRPs in the SFN area transmit substantially the same data and reference signals to the train. In the HST scenario, SFN may be applied with dynamic point switching (DPS), which means that data signals are transmitted from a single TRP at a given time, and the TRP used for transmission is dynamically selected based on the relative quality of channels between the train and a few closest TRPs.

FIG. 2 illustrates an example of a HST SFN deployment. The train may comprise customer-premises equipment (CPE) 200 (for example mounted on the roof of the train) for communicating with one or more track-side deployed gNBs 201, 202, 203 for the backhaul link and to further provide on-board broadband connections to UEs inside the train and/or for other train-specific demands. The CPE may also be referred to as a UE.

In wireless communication systems, information may be transmitted via a radio channel. The effect of the channel on the transmitted signal may need to be estimated in order to recover the transmitted data. Reference signals, which may also be referred to as pilots, may be transmitted along with the data in order to obtain channel state information knowledge for proper decoding of received signals. Reference signals are pre-defined signals that are known at both the transmitter and receiver. Thus, the receiver can estimate the effect of the channel by comparing the received reference signal with the original reference signal known at the receiver. Reference signals may be used in both downlink (DL) and uplink (UL) for example for obtaining accurate channel knowledge in order to derive channel state information (CSI), for demodulating data, for allowing the receiver to perform fine time and frequency channel tracking, for UL/DL beam management, for UL/DL scheduling purposes, and/or for interference estimation in UL/DL.

The demodulation reference signal (DMRS) is a reference signal that may be used at the receiver for performing channel estimation for coherent demodulation of the associated data. However, in low signal-to-noise ratio (SNR) conditions, the channel estimation performance may be poor, thus representing a bottleneck to link-level performance.

In such situations, DMRS bundling may be used to improve the reliability of the channel estimation. DMRS bundling means that channel estimates from different DMRS transmissions, in different orthogonal frequency-division multiplexing (OFDM) symbols, are averaged or otherwise combined to provide a more reliable channel estimation. DMRS bundling can be applied for DMRS(s) in the same slot or across different slots (e.g. in case of repetitions of the channel). One of the main conditions for DMRS bundling to be effective is that the channel does not change excessively across DMRS transmissions. If the channel changes too much, the combination of different channel estimates loses its effectiveness.

The channel state information reference signal (CSI-RS) is a downlink reference signal. The CSI-RS that a UE receives is used to estimate the channel and report channel quality information back to the base station. For example, CSI-RS may be used for reference signal received power (RSRP) measurements during mobility and beam management. CSI-RS may also be used for frequency and/or time tracking, demodulation, and UL channel reciprocity-based precoding. Non-zero-power CSI-RS (NZP-CSI-RS) may be used for procedures such as channel measurement, beam management, beam measurement, and/or connected mode mobility, whereas zero-power CSI-RS (ZP-CSI-RS) comprises empty resource elements used mostly for interference measurement. CSI-RS may be configured specific to a given UE, but multiple UEs may also share the substantially same resource. A CSI-RS resource may start at any OFDM symbol of the slot and it may occupy, for example, 1, 2 or 4 OFDM symbols depending on the configured number of ports. CSI-RS may be periodic, semi-persistent, or aperiodic due to downlink control information (DCI) triggering. For time and/or frequency tracking, CSI-RS can be periodic or aperiodic. It may be transmitted in bursts of two or four symbols, which may be spread across one or two slots.

The time and/or frequency tracking CSI-RS may also be called a tracking reference signal (TRS). The TRS may be used for frequency and time offset estimation at the UE, and it may be configured in a UE-specific manner. TRS is defined by a NZP-CSI-RS resource set, which may comprise two or four NZP-CSI-RS resources and has the field trs-info enabled. Currently in FR2, for example, one resource set may comprise two periodic CSI-RS resources in one slot, or four periodic CSI-RS resources in two consecutive slots (i.e. two resources per slot).

The time-domain locations of the two CSI-RS resources in a slot, or of the four CSI-RS resources in two consecutive slots may be defined by one of:

l∈{4,8}, l∈{5,9}, or l∈{6,10} for FR1 and FR2,
l∈{0,4}, l∈{1,5}, l∈{2,6}, l∈{3,7}, l∈{7,11}, E {8,12}, or l∈{9,13} for FR2.

Figure 3:
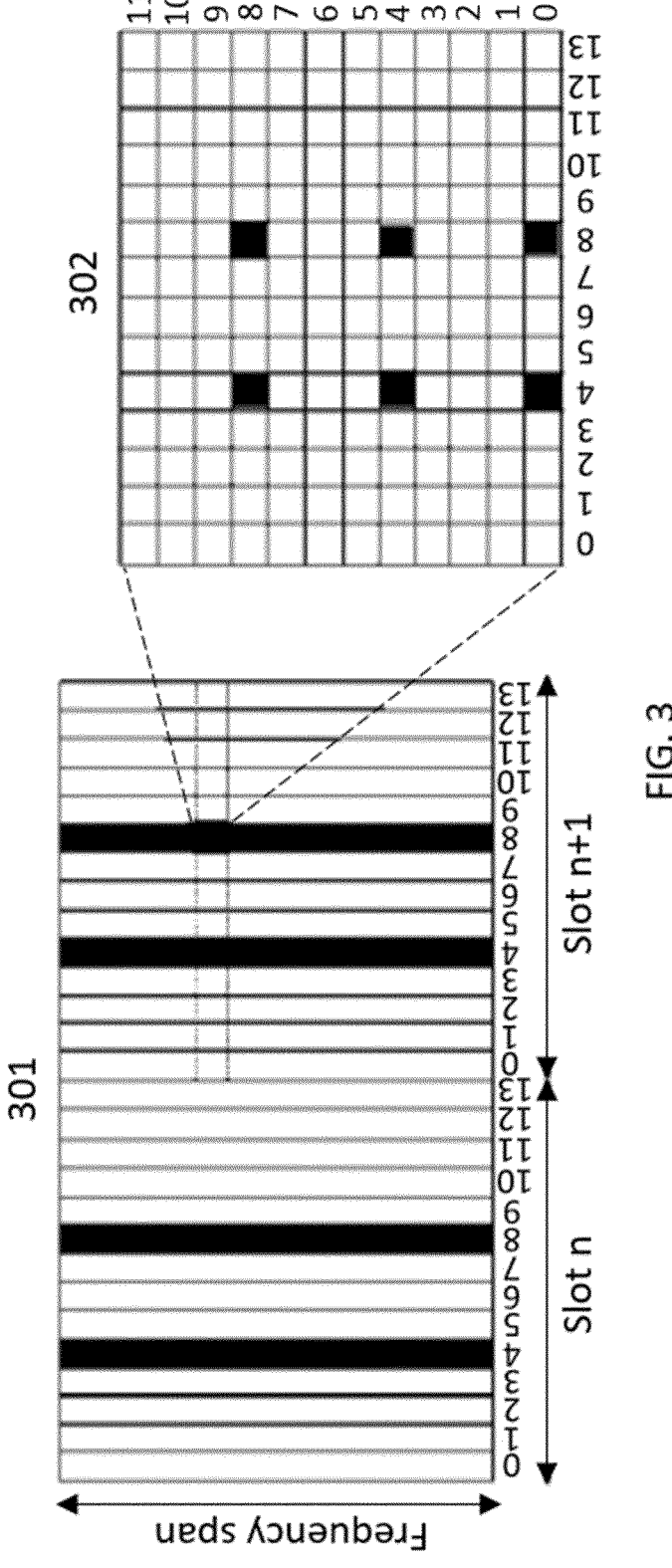
FIG. 3 illustrates an example of tracking reference signal time and frequency configuration in two consecutive slots.

FIG. 3 illustrates an example of TRS time and frequency configuration in two consecutive slots. In this example, CSI-RS resources in the TRS resource set 301 occupy symbols 4 and 8 in two consecutive slots, and the CSI-RS resources 302 have a density of 3 resource elements (REs) per resource block (RB).

Figure 4:
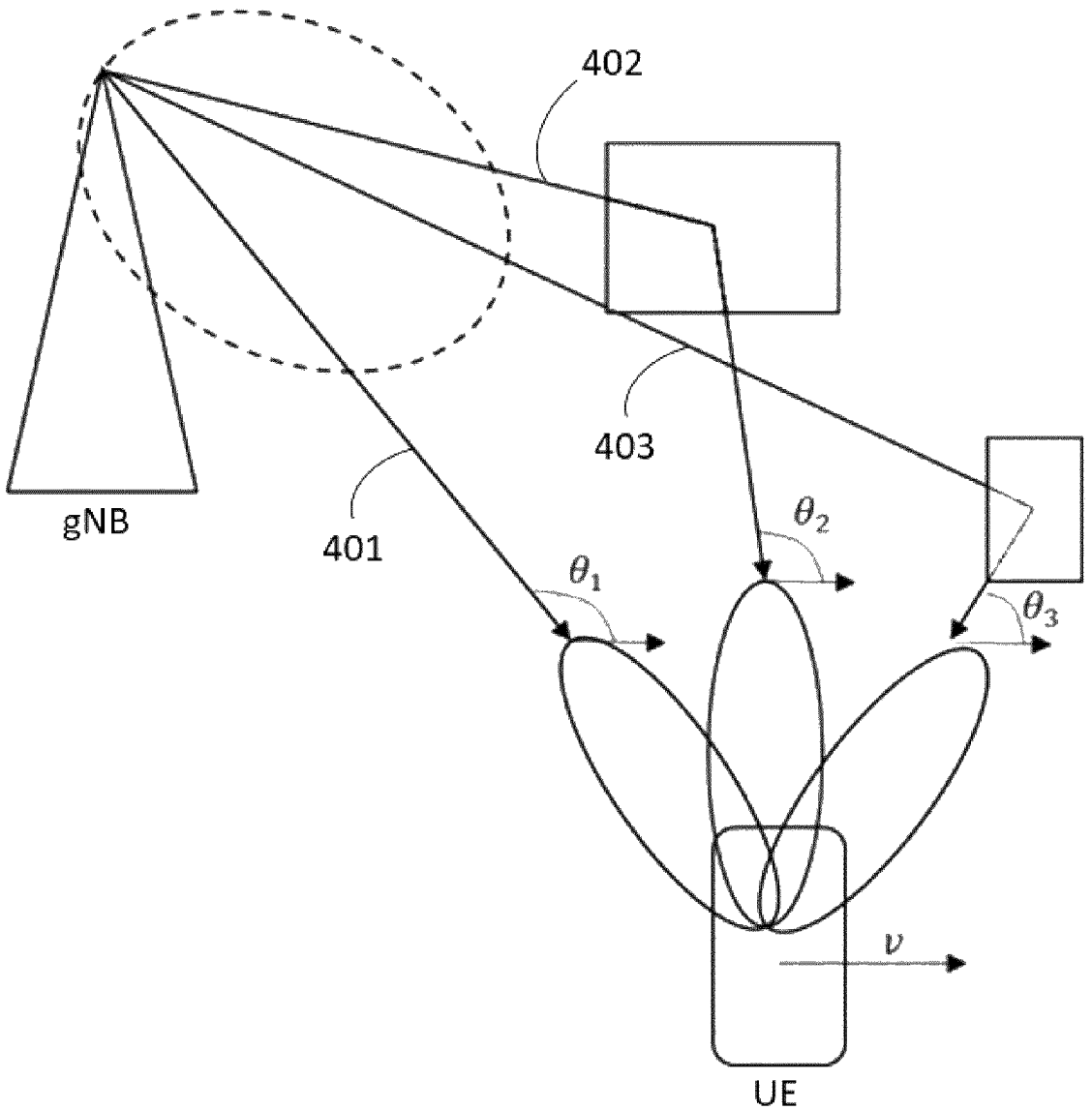
FIG. 4 illustrates an example of beam-specific channel variability in frequency range 2.

FR2 UEs are characterized by a beam-based radio interference and, consequently, by a beam-specific channel variability. FIG. 4 illustrates an example of beam-specific channel variability in FR2. As shown in FIG. 4, a given receive/transmit UE beam 401, 402, 403 may filter out some of the channel components in the spatial domain, characterized by specific Doppler shift values. The Doppler shift (and thus channel variability) experienced by the UE depends on the pointing direction $\theta_1$, $\theta_2$, $\theta_3$ of the spatial filter (beam). In this example, the second beam 402 is the one affected by the least variability ($\theta_2 \cong 90°$), which may benefit receiver performance.

The Doppler shift may be calculated as follows:

$$f_d^i = \frac{v}{c} f_c \cos(\theta_i),$$

where v is the velocity of the UE, c is the speed of light (~299792 km/s), $f_c$ is the original transmitted frequency, and $\theta_i$ is the pointing direction of a given beam.

The main challenge in an HST scenario is the high speed at which UEs move relative to the RRH. In addition, UEs inside the train served from an outdoor FR2 RRH may be subject to low SNR due to large propagation and penetration losses. These two factors together heavily impact the performance of the channel estimator, considering that the single shot channel estimation is not reliable and DMRS bundling (for averaging and noise reduction) cannot be used due to the rapidly changing channel conditions.

Additionally, it is difficult to remove the Doppler shift (which causes the changing channel conditions), since the frequency offset estimation (FOE) and frequency offset compensation (FOC) may not be reliable at low SNR and high speeds, exceeding the single shot FOE design range. The error on the single shot estimate may cause a sudden complete breakdown of the link performance and reliability once the design range is exceeded (see Table 1 below), and a possible time-averaging window is too short to compensate for such a breakdown due to the high-speed conditions.

Table 1 below depicts simulation results on the impact of large channel variability and frequency offset on link performance. Table 1 represents the SNR values at which 70% of the maximum throughput is achieved with different modulation and coding schemes (MCS). From Table 1, it can be seen that, at high speed (and thus large frequency offset), the link adaptation is not able to compensate for the loss due to unreliable FOE/FOC regardless of the SNR value. The HST scenario is characterized by large frequency offset values, and a solution to alleviate the impact of frequency offset on system performance is needed. It is noted that the single shot FOE design range is directly proportional to the time density of the used reference signals, and hence it cannot be increased without limit. It is also subject to scheduling constraints, NR limitations, as well as device capabilities.

TABLE 1

| | Multi-path channel | | | | | | | | |
|---|---|---|---|---|---|---|---|---|---|
| | PDSCH Mapping type B | | | | | | | | |
| | 14 OFDM data symbols   2 DMRS symbols Max distance DMRS to DMRS symbol: 6 | | | | | | | | |
| | UE velocity | | | | | | | | |
| | 20 km/h | 50 km/h | 80 km/h | 120 km/h | 160 km/h | 200 km/h | 275 km/h | 350 km/h | 500 km/h |
| MCS 0 | −10.8 | −10.7 | −10.7 | −10.8 | −10.7 | −10.8 | −10.6 | N/A | N/A |
| MCS 1 | −9.7 | −9.6 | −9.4 | −9.4 | −9.3 | −9.2 | −8.9 | N/A | N/A |
| MCS 2 | −8.9 | −8.7 | −8.6 | −8.6 | −8.4 | −8.4 | −8.0 | N/A | N/A |
| MCS 3 | −7.8 | −7.7 | −7.5 | −7.5 | −7.3 | −7.3 | −7.0 | N/A | N/A |
| MCS 4 | −6.8 | −6.7 | −6.6 | −6.5 | −6.4 | −6.3 | −6.0 | N/A | N/A |
| MCS 5 | −5.9 | −5.7 | −5.6 | −5.5 | −5.4 | −5.3 | −5.0 | N/A | N/A |
| MCS 6 | −4.9 | −4.8 | −4.7 | −4.6 | −4.5 | −4.4 | −4.0 | N/A | N/A |
| MCS 7 | −3.0 | −3.8 | −3.7 | −3.6 | −3.5 | −3.4 | −3.0 | N/A | N/A |
| MCS 8 | −2.9 | −2.7 | −2.6 | −2.5 | −2.3 | −2.8 | −1.6 | N/A | N/A |
| MCS 9 | −2.1 | −1.9 | −1.7 | −1.6 | −1.5 | −1.3 | −0.7 | N/A | N/A |
| MCS 10 | −1.6 | −1.4 | −1.2 | −1.1 | −0.9 | −0.8 | −0.1 | N/A | N/A |
| MCS 11 | −1.0 | −.08 | −0.7 | −0.5 | −0.4 | −0.2 | 0.6 | N/A | N/A |

13

TABLE 1-continued

| | Multi-path channel | | | | | | | | |
|---|---|---|---|---|---|---|---|---|---|
| | PDSCH Mapping type B | | | | | | | | |
| | 14 OFDM data symbols    2 DMRS symbols Max distance DMRS to DMRS symbol: 6 | | | | | | | | |
| | UE velocity | | | | | | | | |
| | 20 km/h | 50 km/h | 80 km/h | 120 km/h | 160 km/h | 200 km/h | 275 km/h | 350 km/h | 500 km/h |
| MCS 12 | −0.1 | 0.1 | 0.4 | 0.5 | 0.7 | 1.0 | 2.6 | N/A | N/A |
| MCS 13 | 0.9 | 1.0 | 1.2 | 1.3 | 1.6 | 2.0 | 4.3 | N/A | N/A |
| MCS 14 | 1.8 | 1.9 | 2.2 | 2.3 | 2.6 | 3.0 | 4.7 | N/A | N/A |
| MCS 15 | 3.0 | 3.1 | 3.3 | 3.5 | 3.8 | 4.4 | 5.3 | N/A | N/A |
| MCS 16 | 5.4 | 5.6 | 5.8 | 6.0 | 6.4 | 5.1 | N/A | N/A | N/A |
| MCS 17 | 6.2 | 6.4 | 6.6 | 6.8 | 7.2 | 6.4 | N/A | N/A | N/A |
| MCS 18 | 6.9 | 7.1 | 7.3 | 7.5 | 8.0 | 8.4 | N/A | N/A | N/A |
| MCS 19 | 7.6 | 7.8 | 8.1 | 8.3 | 9.1 | 9.3 | N/A | N/A | N/A |
| MCS 20 | 8.5 | 8.7 | 8.9 | 9.2 | 9.3 | 9.4 | N/A | N/A | N/A |
| MCS 21 | 9.6 | 9.8 | 10.1 | 10.5 | 9.5 | N/A | N/A | N/A | N/A |
| MCS 22 | 8.6 | 8.9 | 9.2 | 9.7 | 9.6 | N/A | N/A | N/A | N/A |

Some exemplary embodiments enable a UE and/or gNB to exploit the beam-specific channel variability characterizing FR2 operation, in order to improve system and link performance in a high-speed (e.g. HST) scenario. Some exemplary embodiments enable the UE to measure the frequency offset (FO) on different UE and/or gNB beams, and use the beam or pair of beams that offers the best trade-off between reference signal received power (RSRP) and the frequency offset. RSRP is proportional to SNR. It may be advantageous for high-speed UEs to incorporate FO measurements in beam-selection-related feedback to the gNB, such that signal paths with differing FO impact can be privileged.

Some exemplary embodiments may be applied to NR and to the FR2 HST scenario, for example. However, some exemplary embodiments are not limited in use or applicability to neither NR nor the FR2 HST scenario. Some exemplary embodiments may be applied to any scenario that involves UE mobility, for example in highway deployments.

In an exemplary embodiment, the beam that offers the best trade-off between RSRP and FO is determined as the beam that maximizes a metric denoted as M. The metric M may be defined per beam b as $M_b$, and it may represent the overall variation in SNR for a certain target block error rate (BLER) caused by the $RSRP_b$ and $FO_b$ measured for beam b, when compared to the beam with the highest RSRP ($RSRP_{max}$). The metric $M_b$ may be defined for example as follows:

$$M_b[dB] = k * \Delta SNR_{RSRP_b} - j * \Delta SNR_{FO_b}$$

where $\Delta SNR_{RSRP}$, and $\Delta SNR_{FO_b}$ represent the impact to the SNR provided by the RSRP and FO, respectively, measured at beam b, compared to the SNR of the beam with the highest RSRP. The weight factors k and j are design parameters that allow flexibility in the computation of $M_b$ based on the velocity of the UE. The first weight factor k indicates a priority for a high RSRP, whereas the second weight factor j indicates a priority for a low FO. For example, for a low-speed UE, j may be set equal to 0 and k may be set equal to 1 as a fallback to the legacy beam selection based on RSRP alone. In another example, for a high-speed UE, j may be set equal to 1 and k may be set equal to 0.2 in order to prioritize low FO when selecting the beam. As described above, in some cases no amount of SNR may be able to compensate for the throughput loss caused by a large FO, in which case it may be beneficial to prioritize smaller FO instead of larger RSRP. In other words, the metric $M_b$ may indicate a trade-off between RSRP and FO for a given beam b. As a non-limiting example, a low-speed UE may be defined as a UE with a velocity up to 30 km/h, and a high-speed UE may be defined as a UE with a velocity of 120 km/h or more.

Table 2 below shows an example calculation of the metric $M_b$ for a UE equipped with 3 beams and k=j=1. Table 2 also shows the measured RSRP and FO per beam. The mapping between the values of FO and $\Delta SNR_{FO_b}$ is based on Table 1 above, in the case of MCS 18.

For beam 1, $\Delta SNR_{RSRP_b}$=−50+RSRP$_{max}$  0 dB, $\Delta SNR_{FO_b}$=0 dB, and $M_b$=1*0 dB−1*0 dB=0 dB, since beam 1 is the beam with the highest RSRP (i.e. RSRP$_{max}$).

For beam 2, $\Delta SNR_{RSRP_b}$=−53+RSRP$_{max}$=−3 dB, $\Delta SNR_{FO_b}$=6.9 dB−10.4 dB=−3.5 dB, and $M_b$=1*−3 dB−1*−3.5 dB=0.5 dB. The values 6.9 dB and 10.4 dB for calculating $\Delta SNR_{FO_b}$ for beam 2 are obtained from the MCS 18 row of Table 1 for the velocities 10 km/h and 150 km/h, respectively.

For beam 3, $\Delta SNR_{RSRP_b}$=−55+RSRP$_{max}$=−5 dB, $\Delta SNR_{FO_b}$=7.5 dB−10.4 dB=−2.9 dB, and $M_b$=1*−5 dB−1*−2.9 dB=−2.1 dB. The values 7.5 dB and 10.4 dB for calculating $\Delta SNR_{FO_b}$ for beam 3 are obtained from the MCS 18 row of Table 1 for the velocities 90 km/h and 150 km/h, respectively.

In this example, beam 2 is thus the beam that offers the best trade-off between RSRP and FO based on the metric $M_b$.

TABLE 2

| | $RSRP_b$ | $FO_b$ | $M_b$ [db] |
|---|---|---|---|
| Beam 1 | −50 dBm | 4.2 kHz (150 km/h) | 0 |
| Beam 2 | −53 dBm | 278 Hz (10 km/h) | 0.5 |
| Beam 3 | −55 dBm | 3.3 kHz (90 km/h) | −2.1 |

Once the metric $M_b$ for optimal beam selection is established (i.e. configured at the UE), the UE needs appropriate radio resources in order to be able to measure RSRP and FO on its different beams. In FR2, UEs may currently be limited to one analog beam per OFDM symbol. The UE may then use the selected beam for communication with the network.

Figure 5:
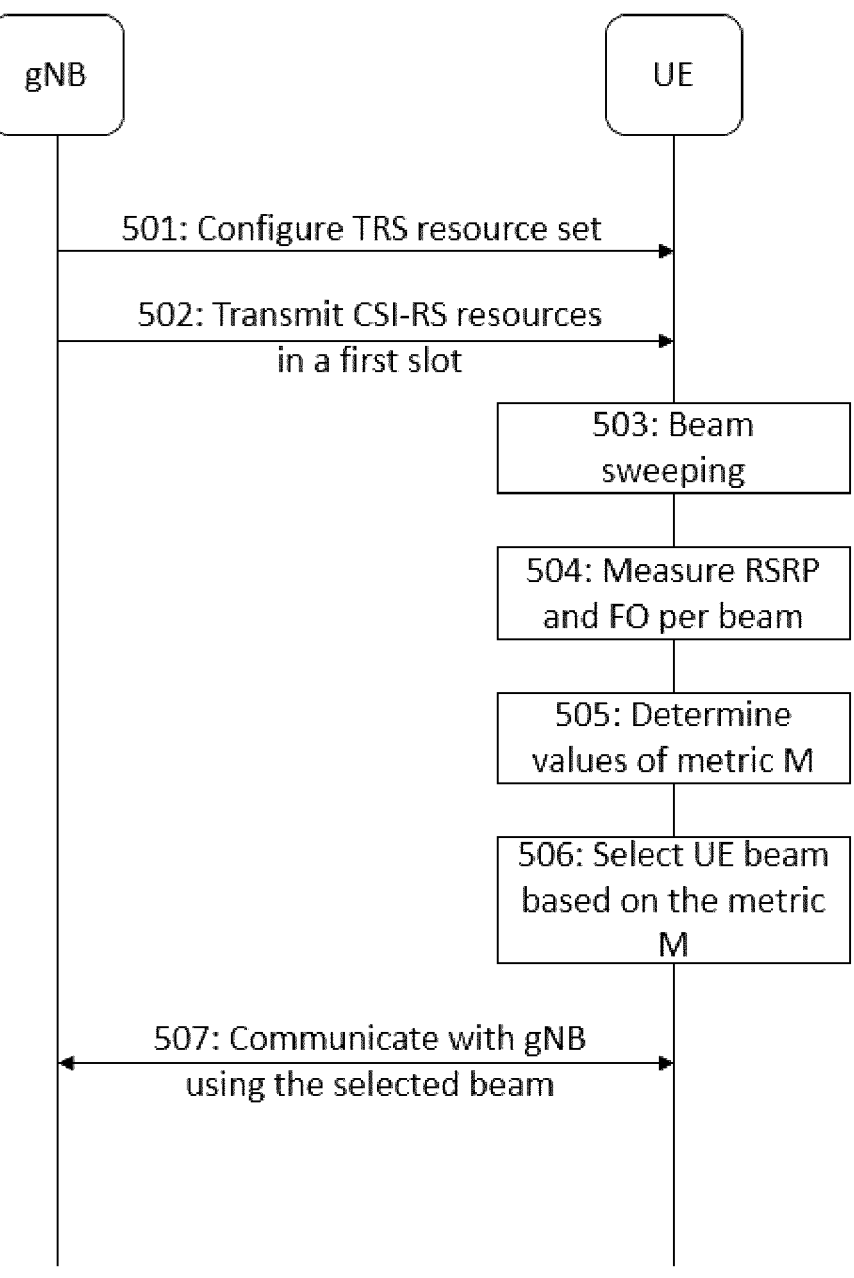
FIG. 5 illustrates a signaling diagram according to an exemplary embodiment.

FIG. 5 illustrates a signaling diagram according to an exemplary embodiment, wherein sequential measurement of FO is performed on different UE beams.

Referring to FIG. 5, a base station such as a gNB configures 501 a TRS resource set to a UE via RRC configuration with at least two NZP-CSI-RS resources per slot. The spacing between a given pair of NZP-CSI-RS resources in the TRS resource set may be smaller than 4 OFDM symbols, in order to accommodate multiple UE beams. This configuration allows the UE to sweep through its analog beams and measure RSRP and FO per beam.

The gNB transmits 502 to the UE, in a first time slot, a first plurality of NZP-CSI-RS resources associated with the configured TRS resource set. The first plurality of NZP-CSI-RS resources comprises at least two NZP-CSI-RS resources in the first time slot.

The UE utilizes the received resources to sweep 503 through a plurality of its receive/transmit beams. The UE measures 504 an RSRP value and a FO value per beam on the plurality of beams by utilizing two or more resources of the first plurality of NZP-CSI-RS resources per beam. The RSRP may be measured on the substantially same resources as the FO, or the RSRP and FO may be measured on different resources.

For example, the FO value per beam may be measured by correlating the two or more resources with one another. The FO may be given by the phase shift between the two or more resources. The phase shift may be found by calculating the cross-correlation function between the two or more resources and normalizing for the distance between the two or more resources. The measured FO value may indicate Doppler shift and/or other imperfections, such as measurement uncertainty at the UE, local oscillator imperfections at the gNB and at the UE, moving or vibrating reflectors on the signal path, etc. For example, the gNB may transmit the two or more resources in a signal with a first center frequency (F1), and the Doppler effect may cause the signal to be received with a different center frequency (F2) at the UE. The FO may then be equal to F2−F1.

The UE determines 505, per beam of the plurality of beams, a value of the metric $M_b$ based at least partly on the measured RSRP value and the FO value of the corresponding beam. The UE selects 506 one or more beams from the plurality of beams based on the metric $M_b$. For example, the UE may select the beam with the highest value of the metric $M_b$. As described previously, the metric $M_b$ indicates an overall variation in SNR for a given beam.

The UE may use the selected one or more beams to communicate 507 with the gNB. For example, the UE may use the selected beam(s) as a receive beam for receiving downlink transmission(s) from the gNB, and/or as a transmit beam for transmitting uplink transmission(s) to the gNB.

Figure 6:
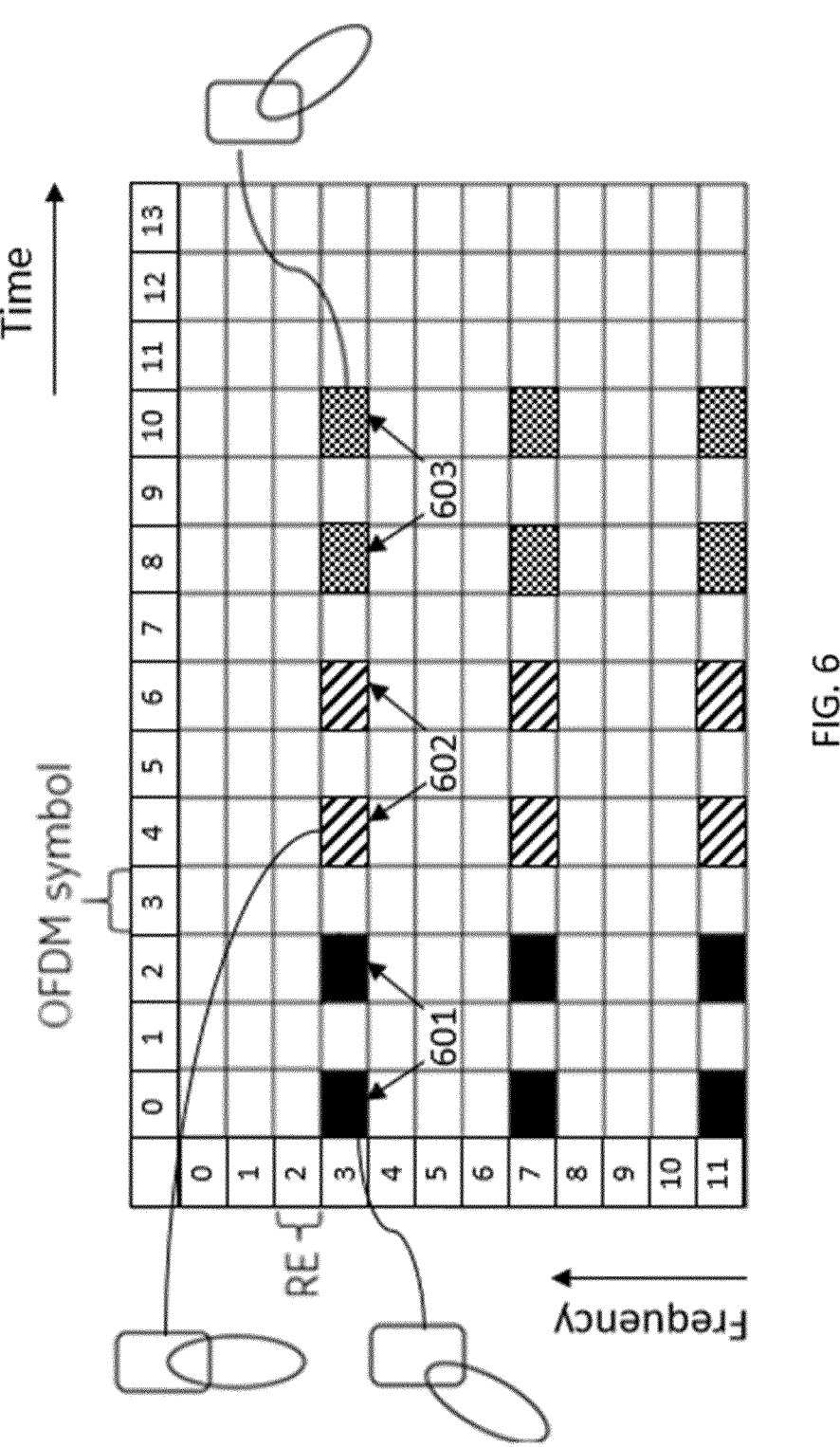
FIG. 6 illustrates an example of channel state information reference signal resources in one slot.

FIG. 6 illustrates an example of a plurality of NZP-CSI-RS resources in one slot according to an exemplary embodiment. In this example, the gNB is aware that the UE has three beams, and thus the gNB configures three pairs 601, 602, 603 of NZP-CSI-RS resources, spaced by 2 OFDM symbols, in one slot for beam sweeping. In other words, the gNB transmits (during step 502 of FIG. 5) six NZP-CSI-RS resources in one slot, and the UE uses a given adjacent pair 601, 602, 603 of resources to measure FO on a given beam. For example, the UE may use the first pair 601 to measure FO on a first beam, the second pair 602 to measure FO on a second beam, and the third pair 603 to measure FO on a third beam. At least one pair of resources may be needed for FO estimation on a given beam.

In another exemplary embodiment, the UE may use more than two or even all of the NZP-CSI-RS resources in one slot for measuring FO on a single beam in order to improve the accuracy of the FO estimate on that beam. This way, the reliability of the FO measurements on the beam may be increased when the UE is moving at high speed, for example. In this case, the UE will not sweep through its receive/transmit beams, and thus step 503 of FIG. 5 is not needed in this exemplary embodiment. Instead, the UE collects multiple (more than two) FO measurements on a single beam. This way, the UE may be able to increase the accuracy of the FOE and FOC, and thus the frequency offset can be more accurately estimated and removed from the incoming signal. Although this can be seen as a simpler procedure compared to beam sweeping at the UE side, its effectiveness depends on channel conditions and may degrade in case a main line-of-sight (LOS) component is not present (i.e. in a non-line-of-sight setting).

Figure 7:
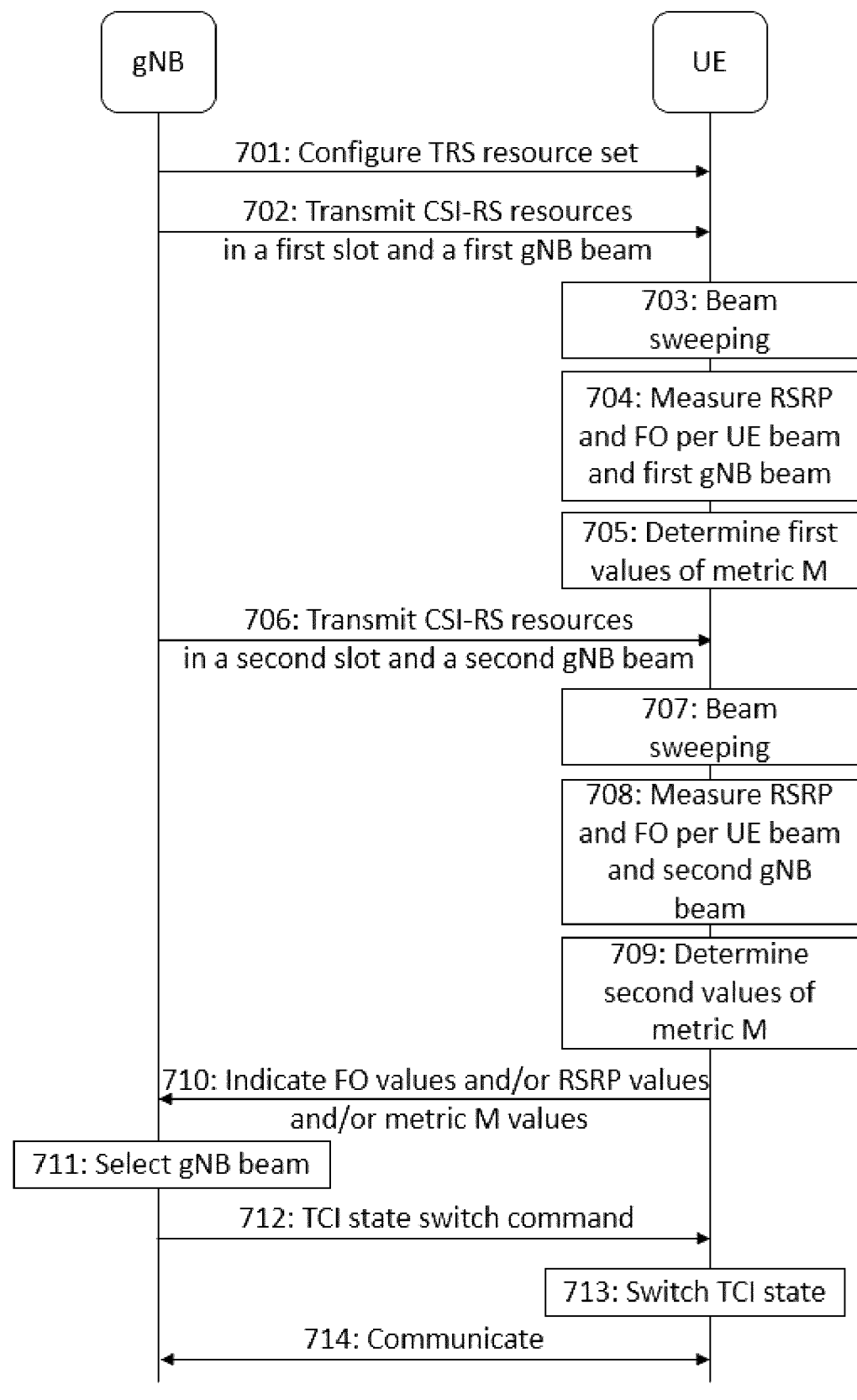
FIGS. 7-8 illustrate signaling diagrams according to some exemplary embodiments.

FIG. 7 illustrates a signaling diagram according to another exemplary embodiment, wherein sequential measurement of FO is performed on different UE beams and gNB beams.

Referring to FIG. 7, a base station such as a gNB configures 701 a TRS resource set to a UE via RRC configuration with at least two NZP-CSI-RS resources per slot. The spacing between a given pair of NZP-CSI-RS resources may be smaller than 4 OFDM symbols, in order to accommodate multiple UE beams. This configuration allows the UE to sweep through its analog beams and measure RSRP and FO per beam.

The gNB transmits 702 to the UE, in a first time slot and on a first gNB beam, a first plurality of NZP-CSI-RS resources associated with the configured TRS resource set. The first plurality of NZP-CSI-RS resources comprises at least two NZP-CSI-RS resources in the first time slot.

The UE utilizes the first plurality of NZP-CSI-RS resources to sweep 703 through a plurality of its receive/transmit beams. The UE measures 704 a first RSRP value and a first FO value per UE beam and the first gNB beam by utilizing two or more resources of the first plurality of NZP-CSI-RS resources per UE beam.

The UE determines 705, per UE beam and the first gNB beam, a first value of the metric $M_b$ based at least partly on the measured first RSRP value and the first FO value of the corresponding beam. The UE may store some or all of the first values of the metric $M_b$ for example in an internal memory of the UE. For example, the UE may store the first value of one or more beams pairs with a higher value of the metric $M_b$ compared to the rest of the beam pairs.

The gNB transmits 706 to the UE, in a second time slot and on a second gNB beam, a second plurality of NZP-CSI-RS resources associated with the configured TRS resource set. The second plurality of NZP-CSI-RS resources comprises at least two NZP-CSI-RS resources in the second time slot.

The UE utilizes the second plurality of NZP-CSI-RS resources to sweep 707 through the plurality of its receive/transmit beams. The UE measures 708 a second RSRP value and a second FO value per UE beam and the second gNB beam by utilizing two or more resources of the second plurality of NZP-CSI-RS resources per UE beam.

As a non-limiting example, if there are three UE beams and two gNB beams, then the UE may first measure a first FO value per UE beam by using two or more resources transmitted on the first gNB beam. Then the UE may measure a second FO value per UE beam by using two or more resources transmitted on the second gNB beam. Thus, there would be a total of six measured FO values in this example, i.e. two FO values per UE beam (in other words, one FO value per UE-gNB beam pair). For example, there may be one FO value associated with the first UE beam and the first gNB beam (first pair of beams), one FO value associated with the first UE beam and the second gNB beam (second pair of beams), one FO value associated with the second UE beam and the first gNB beam (third pair of beams), one FO value associated with the second UE beam and the second gNB beam (fourth pair of beams), one FO value associated with the third UE beam and the first gNB beam (fifth pair of beams), and one FO value associated with the third UE beam and the second gNB beam (sixth pair of beams).

The UE determines 709, per UE beam and the second gNB beam, a second value of the metric $M_b$ based at least partly on the measured second RSRP value and the second FO value of the corresponding beam.

As a non-limiting example, if there are three UE beams and two gNB beams, then the UE first measures a first value of the metric $M_b$ per UE beam by using two or more resources transmitted on the first gNB beam. Then the UE measures a second value of the metric $M_b$ per UE beam by using two or more resources transmitted on the second gNB beam. Thus, there would be a total of six values of the metric $M_b$ in this example, i.e. two values per UE beam (in other words, one value per UE-gNB beam pair). For example, there may be one value $M_1$ associated with the first UE beam and the first gNB beam (first pair of beams), one value $M_2$ associated with the first UE beam and the second gNB beam (second pair of beams), one value $M_3$ associated with the second UE beam and the first gNB beam (third pair of beams), one value $M_4$ associated with the second UE beam and the second gNB beam (fourth pair of beams), one value $M_5$ associated with the third UE beam and the first gNB beam (fifth pair of beams), and one value $M_6$ associated with the third UE beam and the second gNB beam (sixth pair of beams).

The UE transmits 710, to the gNB, an indication indicating the first value of the metric $M_b$ and the second value of the metric $M_b$ for at least a subset of the UE beams. For example, the UE may indicate one or more beam pairs with a higher value of the metric $M_b$ compared to the rest of the beam pairs. Alternatively, the UE may indicate the full set of values. Thus, the metric $M_b$ may be used to determine the pair of UE and gNB beams that offers the best trade-off between RSRP and FO.

Alternatively, the indication 710 may indicate the first FO value and the second FO value (instead of the metric $M_b$ values) for at least a subset of the UE beams. The first RSRP value and the second RSRP value for the at least subset of the UE beams may also be indicated, or reported, from the UE to the gNB. The indication 710 may be transmitted via, for example, a physical uplink control channel (PUCCH) or a physical uplink shared channel (PUSCH).

The gNB may use the FO or metric $M_b$ knowledge for transmission configuration indicator (TCI) state indication. In other words, the gNB selects 711, or allocates, one or more gNB beams based on the indication, wherein the selected one or more gNB beams are selected from a plurality of beams comprising at least the first gNB beam and the second gNB beam (e.g. the gNB may select the first gNB beam or the second gNB beam based on the indication). For example, if the indication comprises FO values (but no RSRP values and no $M_b$ values), then the gNB may select the gNB beam of the UE-gNB beam pair with the lowest FO. As another example, if both RSRP and FO is known, then the gNB may select the gNB beam of the UE-gNB beam pair with the highest RSRP and tolerable FO. The highest tolerable FO may depend on the reference signal configuration and the known system demodulation performance, which is known internally at the gNB.

The gNB transmits 712 a TCI state switch command (or request) to the UE for switching the UE to a TCI state corresponding with the selected gNB beam(s). The UE then switches 713 the TCI state according to the TCI state switch indication.

The gNB may use the selected one or more beams to communicate 714 with the UE. For example, the gNB may use the selected beam(s) as a transmit beam for transmitting downlink transmission(s) to the UE, and/or as a receive beam for receiving uplink transmission(s) from the UE.

The UE may also select a UE beam based on the metric $M_b$, for example by selecting the UE beam of the UE-gNB beam pair with the highest value of the metric $M_b$, wherein this UE-gNB beam pair may comprise the selected gNB beam.

It should be noted that the gNB may also use more than two gNB beams to transmit NZP-CSI-RS resources to the UE for the RSRP measurements and FO measurements. For example, the gNB may transmit a third plurality of NZP-CSI-RS resources in a third slot on a third gNB beam, a fourth plurality of NZP-CSI-RS resources in a fourth slot on a fourth gNB beam, and so forth.

In the exemplary embodiment of FIG. 7, one of the main differences compared to the exemplary embodiment of FIG. 5 is that the gNB configures TRS resources in one or more slots to enable the UE to measure RSRP and FO on a given UE beam per a given gNB beam. As shown in FIG. 7, the NZP-CSI-RS resources are transmitted on different gNB beams in different slots.

Another major difference in FIG. 7 compared to FIG. 5 is that the UE computes values of the metric $M_b$ per a pair of beams comprising an UE beam and a gNB beam. Some or all of the values are then reported to the gNB. Alternatively, the UE may directly report some or all of the measured FO values per gNB beam, and leave full flexibility to the network for beam management.

A precoding matrix indicator (PMI) allows the UE to report its preferred precoding for downlink transmissions on the physical downlink shared channel (PDSCH) to the gNB. Different PMI codebooks are specified in 5G NR, including, type I, type II, port-selection type II, enhanced type II, and enhanced port-selection type II. A new codebook based on UL-DL partial reciprocity for frequency-division duplexing (FDD) systems is currently under development in the ongoing NR Rel-17. These codebooks have different properties. Nevertheless, from a high level, the PMI payload can be divided into wideband (WB) and sub-band (SB) information.

The WB part of the PMI includes at least a spatial support, $W_1$, which is a matrix of port selection or beam selection out of a grid of beams. How the UE selects the WB beam, when sending back PMI information to the gNB, is up to UE implementation. In legacy systems, RSRP, SNR, and signal-to-interference-plus-noise ratio (SINR) are the main metrics that the UE considers for the spatial support. FO-aware beam selection is a different criterion that needs its own pattern of reference signal transmission. The second part, $W_2$, of the PMI may then used for precoding on top of the spatial support, i.e. beam, described by $W_1$.

Figure 8:
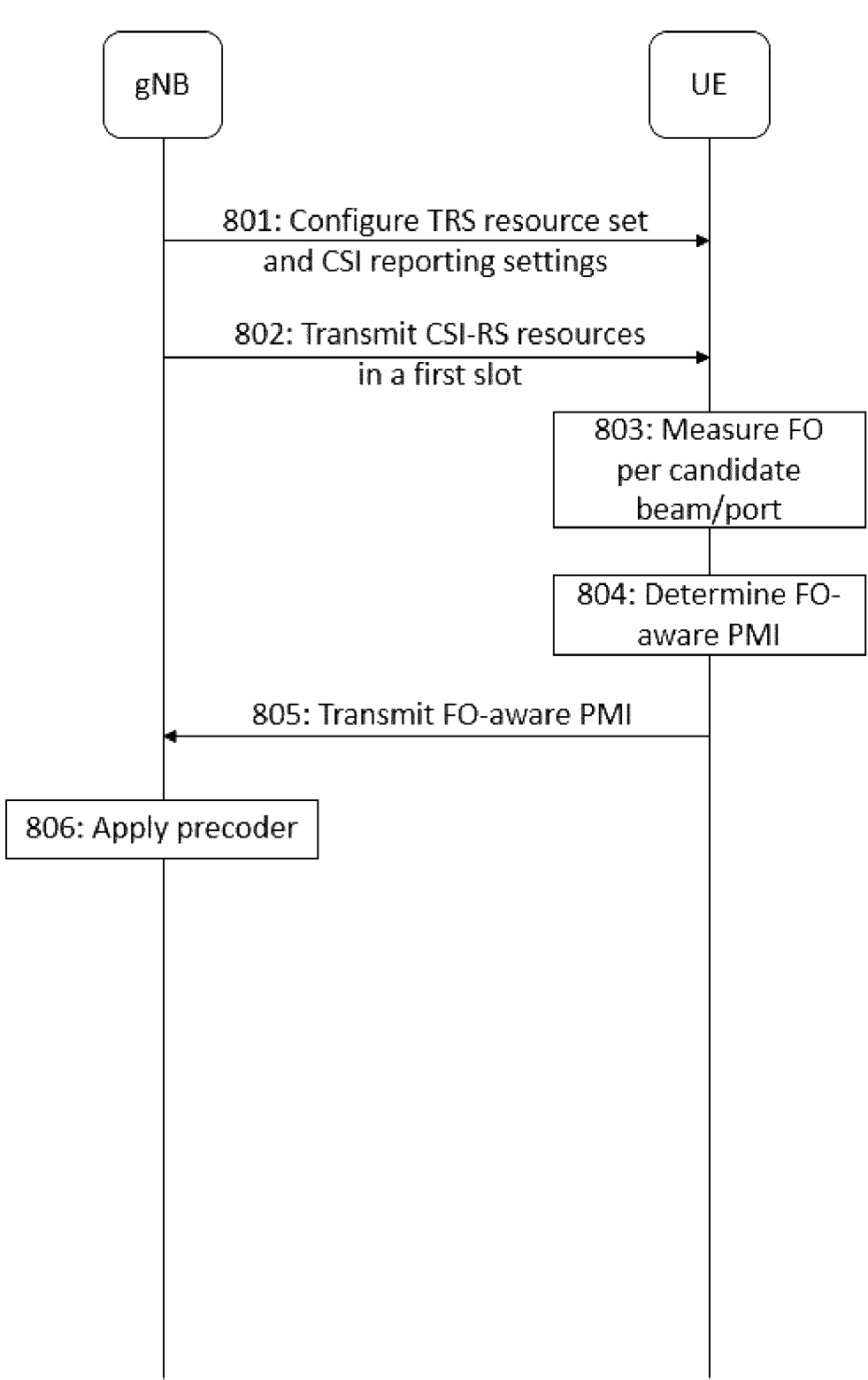

FIG. 8 illustrates a signaling diagram according to another exemplary embodiment, wherein a FO-aware PMI is reported from the UE to the gNB. FO-aware PMI means that FO is used as one of the metrics for determining the PMI. In order to perform FO-aware PMI selection, the configured channel measurement resources (CMR) and/or interference measurement resources (IMR) in CSI-ReportConfig need to be adapted for FO estimation during PMI computation. In other words, the UE needs to measure time-division multiplexed (TDMed) reference signals. This behavior may be indicated to the UE in a configuration or via dynamic downlink signaling in order to make sure that the reported PMI is leading to a reasonable FO, once adopted by the gNB. Additionally, in FO-aware PMI selection, time restriction for interference measurements and channel measurements, respectively, may be disabled.

Referring to FIG. 8, a base station such as a gNB configures 801 a UE via RRC with a TRS resource set and CSI reporting settings (CSI-ReportConfig) indicating PMI as a reporting quantity for CSI reporting. Currently, there is more than one reporting quantity (reportQuantity) that includes PMI.

The gNB transmits 802 to the UE, in a first time slot, a plurality of TDMed NZP-CSI-RS resources comprising at least two NZP-CSI-RS resources in the first time slot.

The UE utilizes the different TDMed NZP-CSI-RS resources in the first time slot to measure 803 the FO per candidate beam and/or port for the PMI spatial support. In this case, the UE uses the different CSI-RS resources as repetitions to improve the selection of the PMI spatial support, i.e. $W_1$, through two-dimensional discrete Fourier transform (DFT) beam selection or port selection. The repetition of a single resource within a single slot enables the UE to estimate FO per candidate beam and/or port, which is used for the PMI spatial support selection. In other words, multiple FO measurements per beam are obtained to refine the FO result (i.e. to get rid of small scale fading effects in the FO result), and thus improve the quality of the metric M.

The UE determines 804, or estimates, a FO-aware PMI based at least partly on the measured FO with an objective to optimize a trade-off between FO and RSRP, SINR, or SNR. Instead of selecting the $W_1$ beams or ports based on an RSRP, SINR or SNR criterion alone, FO is also considered in the construction of $W_1$ in addition to RSRP, SINR or SNR. Thus, the resulting PMI is better suited for high-speed scenarios, since its spatial support minimizes the impact of the FO.

The UE transmits 805 the determined FO-aware PMI to the gNB via PUSCH or PUCCH, for example in uplink control information (UCI). In other words, the UE recommends a PMI, via CSI reporting, that optimizes the trade-off between FO and RSRP, SINR, or SNR. The PMI indicates the precoder that the UE prefers to be used by the gNB. The gNB applies 806 the precoder indicated by the FO-aware PMI received from the UE in the baseband downlink signal processing.

Reporting of the FO-aware PMI may be explicitly requested by the gNB in the CSI reporting configuration or via dynamic downlink signaling. For example, the gNB may request the FO-aware PMI from the UE, whenever the gNB detects a high velocity of UE movement.

Figure 9:
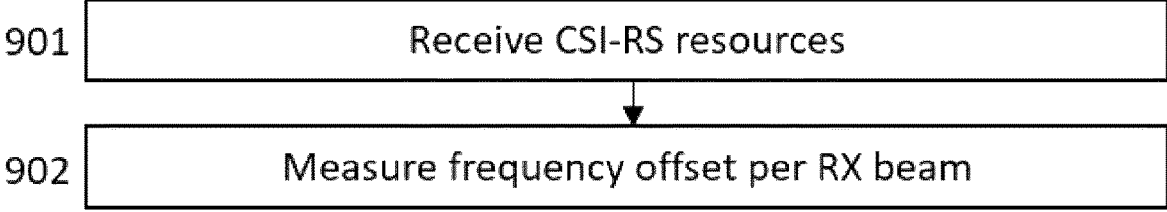
FIGS. 9-10 illustrate flow charts according to some exemplary embodiments.

FIG. 9 illustrates a flow chart according to an exemplary embodiment. The functions illustrated in FIG. 9 may be performed by an apparatus such as, or comprised in, a terminal device (UE). Referring to FIG. 9, the apparatus receives 901, from a base station, in a first time slot, a first plurality of channel state information reference signal resources comprising at least two channel state information reference signal resources. The apparatus measures 902 a first frequency offset value per receive beam on a plurality of receive beams by utilizing two or more resources of the first plurality of channel state information reference signal resources per receive beam.

Figure 10:
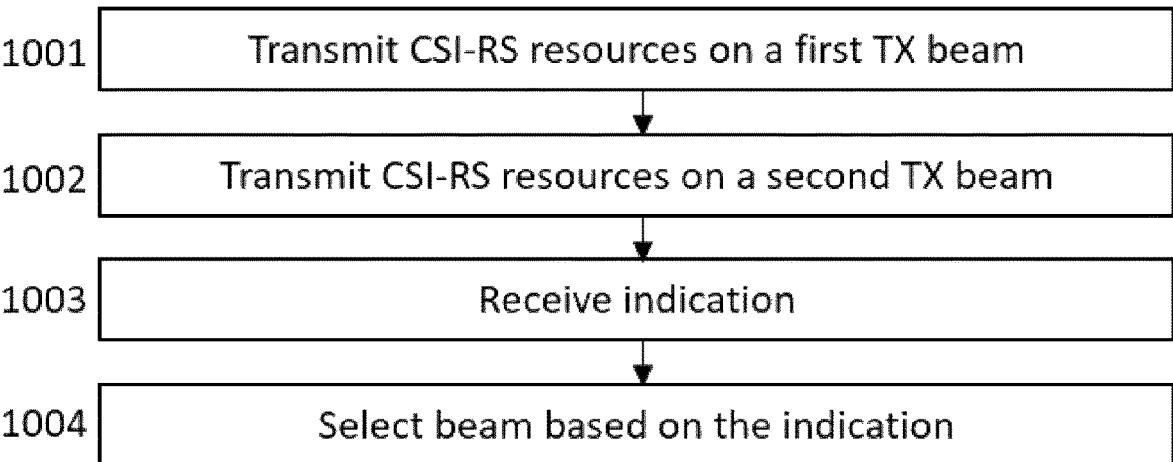

FIG. 10 illustrates a flow chart according to an exemplary embodiment. The functions illustrated in FIG. 10 may be performed by an apparatus such as, or comprised in, a base station. Referring to FIG. 10, the apparatus transmits 1001, to a terminal device, in a first time slot and on a first transmit beam, a first plurality of channel state information reference signal resources comprising at least two channel state information reference signal resources. The apparatus transmits 1002, to the terminal device, in a second time slot and on a second transmit beam, a second plurality of channel state information reference signal resources comprising at least two channel state information reference signal resources. The apparatus receives 1003, from the terminal device, an indication indicating at least a first value associated with the first transmit beam and/or a second value associated with the second transmit beam, wherein the first value and the second value indicate a frequency offset or a variation in a signal-to-noise ratio. The apparatus selects 1004 a beam based at least partly on the indication received from the terminal device, wherein the beam is selected from a plurality of beams comprising at least the first transmit beam and the second transmit beam.

The functions and/or blocks described above by means of FIGS. 5 and 7-10 are in no absolute chronological order, and some of them may be performed simultaneously or in an order differing from the described one. Other functions and/or blocks may also be executed between them or within them.

A technical advantage provided by some exemplary embodiments is that they may improve link and system performance for UEs with high speed and low SNR (e.g. UEs inside a high-speed train) by enabling an enhanced frequency-offset-aware beam selection. A low frequency offset allows exploitation of solutions such as DMRS bundling, which may be effective in coverage shortage (low SNR) scenarios. Furthermore, a low frequency offset improves FOE/FOC reliability, since it will not exceed the FOE design range.

Figure 11:
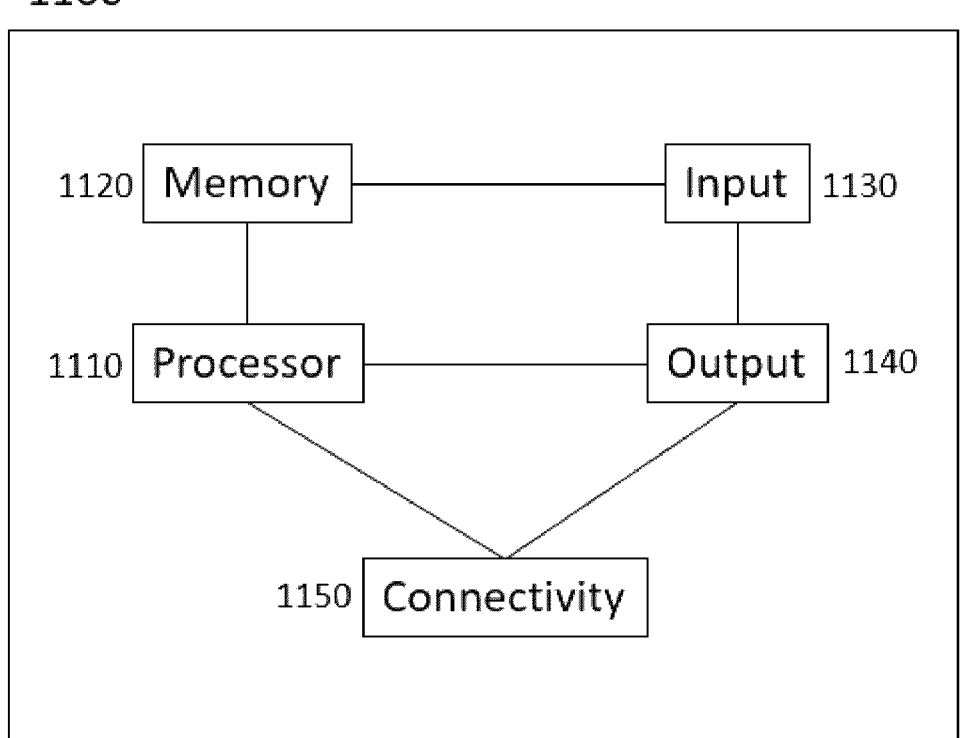
FIGS. 11-12 illustrate apparatuses according to some exemplary embodiments.

FIG. 11 illustrates an apparatus 1100, which may be an apparatus such as, or comprised in, a terminal device, according to an exemplary embodiment. A terminal device may also be referred to as a UE or user equipment herein. The apparatus 1100 comprises a processor 1110. The processor 1110 interprets computer program instructions and processes data. The processor 1110 may comprise one or more programmable processors. The processor 1110 may comprise programmable hardware with embedded firmware and may, alternatively or additionally, comprise one or more application-specific integrated circuits (ASICs).

The processor 1110 is coupled to a memory 1120. The processor is configured to read and write data to and from the memory 1120. The memory 1120 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1120 stores computer readable instructions that are executed by the processor 1110. For example, non-volatile memory stores the computer readable instructions and the processor 1110 executes the instructions using volatile memory for temporary storage of data and/or instructions.

The computer readable instructions may have been pre-stored to the memory 1120 or, alternatively or additionally, they may be received, by the apparatus, via an electromagnetic carrier signal and/or may be copied from a physical entity such as a computer program product. Execution of the computer readable instructions causes the apparatus 1100 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1100 may further comprise, or be connected to, an input unit 1130. The input unit 1130 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1130 may comprise an interface to which external devices may connect to.

The apparatus 1100 may also comprise an output unit 1140. The output unit may comprise or be connected to one or more displays capable of rendering visual content, such as a light emitting diode (LED) display, a liquid crystal display (LCD) and/or a liquid crystal on silicon (LCoS) display. The output unit 1140 may further comprise one or more audio outputs. The one or more audio outputs may be for example loudspeakers.

The apparatus 1100 further comprises a connectivity unit 1150. The connectivity unit 1150 enables wireless connectivity to one or more external devices. The connectivity unit 1150 comprises at least one transmitter and at least one receiver that may be integrated to the apparatus 1100 or that the apparatus 1100 may be connected to. The at least one transmitter comprises at least one transmission antenna, and the at least one receiver comprises at least one receiving antenna. The connectivity unit 1150 may comprise an integrated circuit or a set of integrated circuits that provide the wireless communication capability for the apparatus 1100. Alternatively, the wireless connectivity may be a hardwired application-specific integrated circuit (ASIC). The connectivity unit 1150 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1100 may further comprise various components not illustrated in FIG. 11. The various components may be hardware components and/or software components.

Figure 12:
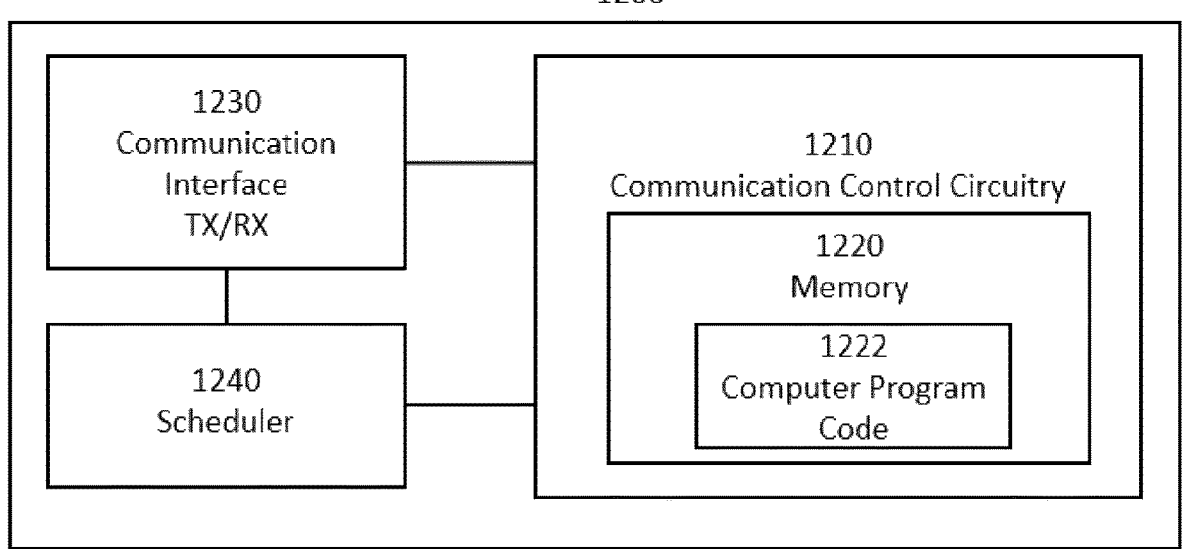

The apparatus 1200 of FIG. 12 illustrates an exemplary embodiment of an apparatus such as, or comprised in, a base station. The base station may be referred to, for example, as a nodeB, an LTE evolved nodeB (eNB), a gNB, an NR base station, a 5G base station, an access point (AP), a distributed unit (DU), a central unit (CU), a baseband unit (BBU), a radio unit (RU), a radio head, a remote radio head (RRH), or a transmission and reception point (TRP). The apparatus may comprise, for example, a circuitry or a chipset applicable to a base station for realizing some of the described exemplary embodiments. The apparatus 1200 may be an electronic device comprising one or more electronic circuitries. The apparatus 1200 may comprise a communication control circuitry 1210 such as at least one processor, and at least one memory 1220 including a computer program code (software) 1222 wherein the at least one memory and the computer program code (software) 1222 are configured, with the at least one processor, to cause the apparatus 1200 to carry out some of the exemplary embodiments described above.

The processor is coupled to the memory 1220. The processor is configured to read and write data to and from the memory 1220. The memory 1220 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EE-PROM), flash memory, optical storage or magnetic storage. In general, memories may be referred to as non-transitory computer readable media. The memory 1220 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

The memory 1220 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1200 may further comprise a communication interface 1230 comprising hardware and/or software for realizing communication connectivity according to one or more communication protocols. The communication interface 1230 comprises at least one transmitter (TX) and at least one receiver (RX) that may be integrated to the apparatus 1200 or that the apparatus 1200 may be connected to. The communication interface 1230 provides the apparatus with radio communication capabilities to communicate in the cellular communication system. The communication interface may, for example, provide a radio interface to terminal devices. The apparatus 1200 may further comprise another interface towards a core network such as the network coordinator apparatus and/or to the access nodes of the cellular communication system. The apparatus 1200 may further comprise a scheduler 1240 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

LIST OF ABBREVIATIONS

4G: fourth generation
5G: fifth generation
ADC: analog-to-digital converter
ASIC: application-specific integrated circuit
BBU: baseband unit
BLER: block error rate
CMR: channel measurement resources
CN: core network
CPE: customer-premises equipment
CPS: cyber-physical system
CSI: channel state information
CSI-RS: channel state information reference signal
CSSP: customer-specific standard product

24

CU: central unit
CU-CP: central unit control plane
CU-UP: central unit user plane
DAC: digital-to-analog converter
DCI: downlink control information
DFE: digital front end
DFT: discrete Fourier transform
DL: downlink
DMRS: demodulation reference signal
DPS: dynamic point switching
DRAM: dynamic random-access memory
DSP: digital signal processor
DSPD: digital signal processing device
DU: distributed unit
EEPROM: electronically erasable programmable read-only memory
eNB: LTE evolved nodeB/4G base station
FDD: frequency-division duplexing
FO: frequency offset
FOC: frequency offset compensation
FOE: frequency offset estimation
FPGA: field programmable gate array
FR1: frequency range 1
FR2: frequency range 2
GEO: geostationary earth orbit
gNB: next generation nodeB/5G base station
GPU: graphics processing unit
HNB-GW: home node B gateway
HST: high-speed train
IAB: integrated access and backhaul
IMR: interference measurement resources
IMS: internet protocol multimedia subsystem
IoT: internet of things
L1: Layer 1
L2: Layer 2
L3: Layer 3
LCD: liquid crystal display
LCoS: liquid crystal on silicon
LED: light emitting diode
LEO: low earth orbit
LOS: line-of-sight
LTE: longterm evolution
LTE-A: long term evolution advanced
M2M: machine-to-machine
MAC: medium access control
MANET: mobile ad-hod network
MCS: modulation and coding scheme
MEC: multi-access edge computing
MIMO: multiple input and multiple output
MME: mobility management entity
mMTC: massive machine-type communications
MT: mobile termination
NaN: not a number
NFV: network function virtualization
NGC: next generation core
NR: new radio
NZP-CSI-RS: non-zero-power channel state information reference signal
OFDM: orthogonal frequency-division multiplexing
PCS: personal communications services
PDA: personal digital assistant
PDCP: packet data convergence protocol
PDSCH: physical downlink shared channel
P-GW: packet data network gateway
PHY: physical
PLD: programmable logic device
PMI: precoding matrix indicator PROM: programmable read-only memory
PTRS: phase-tracking reference signal
PUCCH: physical uplink control channel
PUSCH: physical uplink shared channel
RAM: random-access memory
RAN: radio access network
RAP: radio access point
RAT: radio access technology
RB: resource block
RE: resource element
RI: radio interface
RLC: radio link control
ROM: read-only memory
RRC: radio resource control
RRH: remote radio head
RSRP: reference signal received power
RU: radio unit
RX: receiver
SB: sub-band
SDAP: service data adaptation protocol
SDN: software defined networking
SDRAM: synchronous dynamic random-access memory
SFN: single-frequency network
S-GW: serving gateway
SIM: subscriber identification module
SINR: signal-to-interference-plus-noise ratio
SNR: signal-to-noise ratio
SoC: system-on-a-chip
TCI: transmission configuration indicator
TDM: time-division multiplexing
TRP: transmission and reception point
TRS: tracking reference signal
TRX: transceiver
TX: transmitter
UCI: uplink control information
UE: user equipment/terminal device
UL: uplink
UMTS: universal mobile telecommunications system
UTRAN: UMTS radio access network
UWB: ultra-wideband
vCU: virtualized central unit
vDU: virtualized distributed unit
WB: wideband
WCDMA: wideband code division multiple access
WiMAX: worldwide interoperability for microwave access
WLAN: wireless local area network
ZP-CSI-RS: zero-power channel state information reference signal

The invention claimed is:
1. An apparatus comprising at least one processor, and at least one memory including computer program code, wherein the at least one memory and the computer program code are configured, with the at least one processor, to cause the apparatus to:
 receive, from a base station, in a first time slot, a first plurality of channel state information reference signal resources comprising at least two channel state information reference signal resources; and
 measure a first frequency offset value per receive beam on a plurality of receive beams by utilizing two or more resources of the first plurality of channel state information reference signal resources per receive beam.
2. The apparatus according to claim 1, wherein the first frequency offset value is measured per pair of beams for multiple pairs of beams, wherein a given pair of beams comprises a receive beam associated with the apparatus and a transmit beam associated with the base station.
3. The apparatus according to claim 1, wherein the apparatus is further caused to:
 measure a first reference signal received power value per receive beam on the plurality of receive beams by utilizing at least one resource of the first plurality of channel state information reference signal resources per receive beam;
 select one or more beams from the plurality of receive beams based at least partly on the first reference signal received power value and the first frequency offset value; and
 communicate with the base station by using the selected one or more beams.
4. The apparatus according to claim 3, wherein the apparatus is further caused to:
 determine, per receive beam of the plurality of receive beams, a first value of a metric indicating a variation in a signal-to-noise ratio per receive beam, wherein the first value of the metric is determined based at least partly on the first reference signal received power value and the first frequency offset value;
 wherein the one or more beams are selected from the plurality of receive beams based on the metric.
5. The apparatus according to claim 4, wherein the first value of the metric is determined based further on a first weight factor indicating a priority of a reference signal received power, and a second weight factor indicating a priority of a frequency offset; wherein the first weight factor and the second weight factor are based on a velocity of the apparatus.
6. The apparatus according to claim 1, wherein the first plurality of channel state information reference signal resources is associated with a first transmit beam of the base station; wherein the apparatus is further caused to:
 receive, from the base station, in a second time slot, a second plurality of channel state information reference signal resources associated with a second transmit beam of the base station;
 measure a second frequency offset value per receive beam on the plurality of receive beams by utilizing two or more resources of the second plurality of channel state information reference signal resources per receive beam.
7. The apparatus according to claim 6, wherein the apparatus is further caused to:
 measure a first reference signal received power value per receive beam on the plurality of receive beams by utilizing at least one resource of the first plurality of channel state information reference signal resources per receive beam;
 determine, per receive beam of the plurality of receive beams, a first value of a metric indicating a variation in a signal-to-noise ratio per receive beam, wherein the first value of the metric is determined based at least partly on the first reference signal received power value and the first frequency offset value;
 measure a second reference signal received power value per receive beam on the plurality of receive beams by utilizing at least one resource of the second plurality of channel state information reference signal resources per beam;
 determine, per receive beam of the plurality of receive beams, a second value of the metric based at least partly on the second reference signal received power value and the second frequency offset value;

transmit, to the base station, an indication indicating the first value of the metric and/or the second value of the metric for at least one beam of the plurality of receive beams.

8. The apparatus according to claim 1, wherein the apparatus is further caused to:

transmit, to the base station, an indication indicating at least the first frequency offset value of at least one beam of the plurality of receive beams.

9. The apparatus according to claim 1, wherein the apparatus is further caused to:

determine a precoder matrix indicator based at least partly on the first frequency offset value of the plurality of receive beams; and transmit the precoder matrix indicator to the base station.

10. The apparatus according to claim 1, wherein the first plurality of channel state information reference signal resources comprises more than two channel state information reference signal resources, and wherein the first frequency offset value for a first beam of the plurality of receive beams is measured by utilizing more than two resources of the first plurality of channel state information reference signal resources for the first beam.

11. The apparatus according to claim 1, wherein the apparatus is further caused to:

receive, from the base station, a message indicative of a configuration for a tracking reference signal resource set;

wherein the first plurality of channel state information reference signal resources is associated with the tracking reference signal resource set.

12. The apparatus according to claim 1, wherein the apparatus is comprised in a terminal device.

13. An apparatus comprising at least one processor, and at least one memory including computer program code, wherein the at least one memory and the computer program code are configured, with the at least one processor, to cause the apparatus to:

transmit, to a terminal device, in a first time slot and on a first transmit beam, a first plurality of channel state information reference signal resources comprising at least two channel state information reference signal resources;

transmit, to the terminal device, in a second time slot and on a second transmit beam, a second plurality of channel state information reference signal resources comprising at least two channel state information reference signal resources;

receive, from the terminal device, an indication indicating at least a first value associated with the first transmit beam and/or a second value associated with the second transmit beam, wherein the first value and the second value indicate a frequency offset or a variation in a signal-to-noise ratio; and select a beam based at least partly on the indication received from the terminal device, wherein the beam is selected from a plurality of beams comprising at least the first transmit beam and the second transmit beam.

14. The apparatus according to claim 13, wherein the apparatus is further caused to:

transmit, to the terminal device, a message comprising a request for switching to a transmission configuration indicator state associated with the selected beam.

15. The apparatus according to claim 13, wherein the apparatus is further caused to:

communicate with the terminal device by using the selected beam.

16. The apparatus according to claim 13, wherein the apparatus is comprised in a base station.

17. The apparatus according to claim 13, wherein a spacing between the channel state information reference signal resources in the first time slot is less than 4 symbols.

18. A method comprising:

receiving, at a terminal device from a base station, in a first time slot, a first plurality of channel state information reference signal resources comprising at least two channel state information reference signal resources; and measuring a first frequency offset value per receive beam on a plurality of receive beams by utilizing two or more resources of the first plurality of channel state information reference signal resources per receive beam.

19. The method according to claim 18, wherein the first frequency offset value is measured per pair of beams for multiple pairs of beams, wherein a given pair of beams comprises a receive beam associated with the terminal device and a transmit beam associated with the base station.

20. The method according to claim 18, further comprising:

measuring a first reference signal received power value per receive beam on the plurality of receive beams by utilizing at least one resource of the first plurality of channel state information reference signal resources per receive beam;

selecting one or more beams from the plurality of receive beams based at least partly on the first reference signal received power value and the first frequency offset value; and communicating with the base station by using the selected one or more beams.

* * * * *